United States Patent [19]

Wallace

[11] 3,773,175
[45] Nov. 20, 1973

[54] APPARATUS FOR GRADING PIECES OF MEAT

[76] Inventor: Charles H. Wallace, Smithfield, Va. 23430

[22] Filed: Jan. 29, 1971

[21] Appl. No.: 110,926

Related U.S. Application Data

[63] Continuation-in-part of Ser. No. 886,826, Dec. 22, 1969, Pat. No. 3,653,918.

[52] U.S. Cl. .............................................. 209/173
[51] Int. Cl. .............................................. B03b 3/38
[58] Field of Search .................................. 146/222; 209/172–173

[56] References Cited
UNITED STATES PATENTS

| | | | |
|---|---|---|---|
| 1,285,560 | 11/1918 | Chase | 209/173 |
| 1,209,900 | 12/1916 | Stebler et al. | 209/173 |
| 2,051,676 | 8/1936 | Bloedorn | 209/173 |
| 2,234,502 | 3/1941 | Pixton | 209/173 |
| 2,603,352 | 7/1952 | Tromp | 209/172.5 |
| 2,764,289 | 9/1956 | Scheid | 209/173 |

Primary Examiner—Frank W. Lutter
Assistant Examiner—Ralph J. Hill
Attorney—Allen D. Gutchess, Jr.

[57] ABSTRACT

Apparatus is provided for grading or sorting relatively fat and relatively lean hams or other pieces of meat. The hams are placed in a trough through which flows brine of a predetermined density, in which the fatter hams tend to float or seek an upper level in the brine and the leaner ones tend to sink or seek a lower level. Those hams near the surface of the brine in the trough are sold with minimum or no trimming while those near the bottom are de-boned and the fat is removed, with these hams being sold at a premium price. In the particular apparatus, the hams move along the trough containing the brine which is supplied at one end, recirculated when reaching the other end. A plurality of rotatable fingers are mounted at an intermediate portion of the trough to engage and remove hams at an upper level in the brine. Rotatable fingers are also located at the other end of the trough to engage and remove hams at the lower level in the brine.

3 Claims, 3 Drawing Figures

INVENTOR.
CHARLES H. WALLACE
BY
Allen D. Gutchess, jr
ATTORNEY

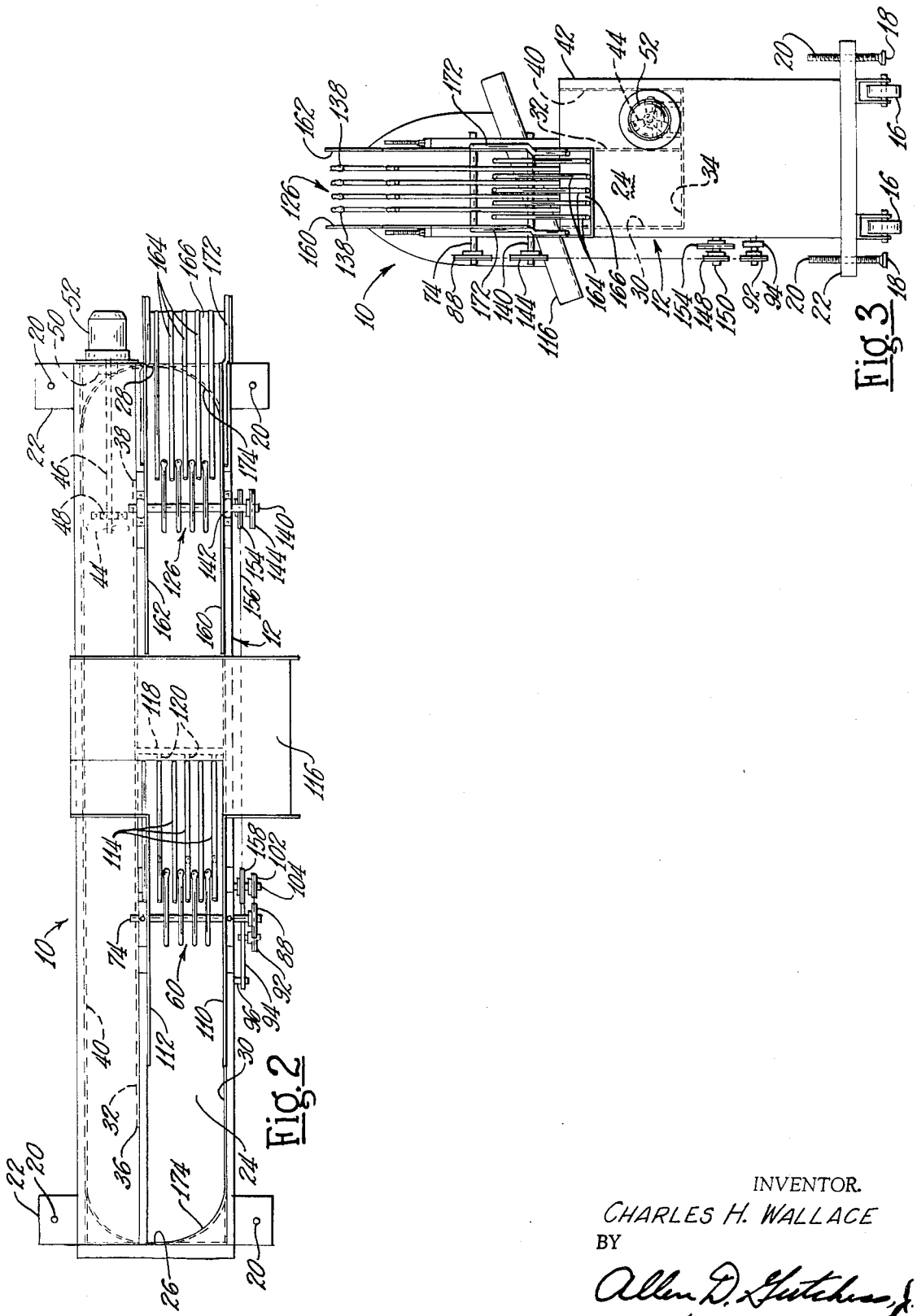

APPARATUS FOR GRADING PIECES OF MEAT

This application is a continuation-in-part of my co-pending application Ser. No. 886,826, filed on Dec. 22, 1969, now U.S. Pat. No. 3,653,918.

This invention relates to apparatus for grading or sorting hams or other pieces of meat, the extent of the fat on and in which may vary from one to another.

Hams are commonly sold by packing houses either substantially as they are cut from the animal carcass, or after they are de-boned and the fat removed, the latter commanding a premium price, of course. The hams also undergo the usual brine "pumping" and smokehouse steps in the slaughtering process. Economically, it is advantageous for the hams having the most fat to be sold with minimum processing and trimming, with the leaner hams being the ones which are de-boned and from which the fat is removed. Obviously, less waste occurs when the leaner hams are used in the latter process. However, even the most experienced meat processors cannot reliably sort or grade relatively fat and relatively lean hams by a visual inspection.

In accordance with the invention, the hams are placed in brine or a salt solution of a predetermined strength or density, selected so that the fatter hams will tend to float or seek an upper level therein and the leaner hams will tend to sink or seek a lower level. The former hams are then removed and packaged for sale with minimum trimming while the fat is removed from the latter hams and they are usually de-boned prior to further processing and packaging. After the grading step, all of the hams undergo the usual further processing steps, including being pumped with brine and being subjected to a cooking or curing smokehouse treatment.

The apparatus for grading the hams includes a container or trough to one end of which brine is supplied, being recirculated. The flow of brine through the trough carries the hams therealong, with the brine thereby acting as both a grading and conveying medium. A plurality of rotatable fingers are mounted on a shaft above an intermediate portion of the trough with the fingers rotating in a path such that they will engage and pick up hams tending to float or being at an upper level in the brine. The hams tending to sink or being at a lower level therein move beyond these rotatable fingers toward the other end of the trough. A second set of rotatable fingers are mounted on a shaft above the other end of the trough and rotate in a path at a lower level to engage and remove the leaner hams which are lower in the brine. Discharge chutes are located adjacent the first and the second set of rotatable fingers to receive the hams from the fingers and discharge them to appropriate locations for further processing. The floating hams, containing more fat, are processed with minimal or no trimming. The sunken hams, containing the least fat, are de-boned and the fat is removed prior to further processing and packaging.

It is, therefore, a principal object of the invention to provide improved apparatus for grading hams or other pieces of meat to separate and sort the relative fat and the relative lean ones before further processing.

Another object of the invention is to provide improved apparatus for grading meat comprising a single trough having meat-engaging means at an intermediate portion thereof for removing pieces of meat from an upper level of brine in the trough and means at the other end of the trough for engaging and removing the lower pieces of meat.

Many other objects and advantages of the invention will be apparent from the following detailed description of a preferred embodiment thereof, reference being made to the accompanying drawings, in which:

FIG. 2 is a top view of the apparatus of FIG. 1; and

FIG. 3 is a right end view of the apparatus of FIGS. 1 and 2.

Figure 1:
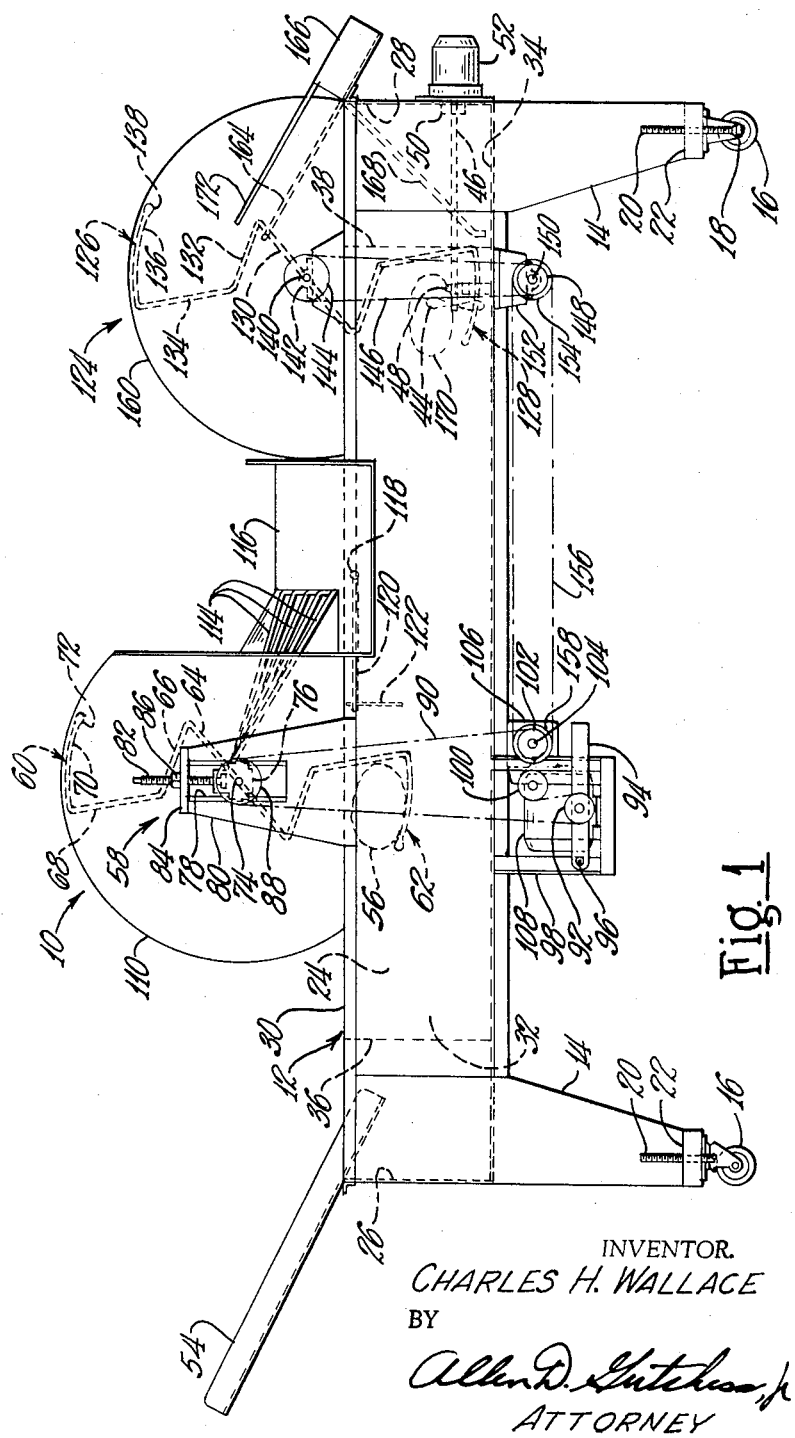
FIG. 1 is a side view in elevation of apparatus for grading or sorting hams or other meat according to the invention.

Referring to the drawings, a preferred form of apparatus for carrying out the invention is indicated at 10 in FIGS. 1–3. The apparatus includes a stainless steel tank 12 having legs 14 with casters 16 which enable the tank to be moved from one location to another as desired, wherever needed for hams being processed. Feet 18 mounted on threaded rods 20 can be turned downwardly to hold the apparatus 10 in position when in use. The feet and rods are mounted in flanges 22 extending outwardly from the legs 14.

The tank 12 includes a main trough or elongate receptacle 24 extending the length of the apparatus 10. The trough is formed by end walls 26 and 28, a side wall 30, a partition 32, and a bottom 34. The partition 32 terminates short of the front end wall 26 at an edge 36 and terminates short of the end wall 28 at an edge 38. The partition thus forms a return trough 40 with a side wall 42 of the tank and the bottom 34.

A propeller or pump 44 is located in the return trough 40 to recirculate the brine from the downstream end of the main trough 24 back through the return trough 40 to the upstream end of the main trough 24. The propeller, as shown, is mounted on an elongate shaft 46 (FIG. 2) which is rotatably supported in a bearing block 48 and extending through a suitable seal 50 in the end wall 28 of the tank 12. A variable-speed drive motor 52 is mounted on the end wall 28 and drives the propeller 44 at any selected speed. The propeller 44 is of a three-blade type and has a heavy plastic coating thereon to reduce possible damage from corrosion and cavitation.

The salt solution or brine in the tank 12 has a level only about two inches from the top thereof. The brine is of a predetermined strength, having a salimeter reading from about 12 to about 30, and preferably from about 15 to about 25, as measured at 38° F. The leaner hams placed in the brine will tend to sink to a lower level therein, while the fatter hams will tend to float or be at an upper level. Of course, many hams will neither clearly float nor sink, so as to be at either the top or the bottom of the brine, but will be distributed throughout its depth as they are moved along through the trough 24. The relative number of any group of hams which will sink or float will depend upon the strength of the brine, with more hams tending to float in brine with a higher salimeter reading. Liquids other than brine can be employed in the apparatus 10 although the brine is preferred since it is inexpensive and aids in preserving the hams.

The leaner hams are separated for de-boning and fat removal while the fatter hams are packaged with a minimum of trimming. By enabling more efficient processing of the hams to be achieved in this manner, a savings of several cents a pound can be achieved, which can amount to a substantial savings daily in large processing plants. Other than for the grading process, the hams are subjected to the usual cooking, curing, and smoking processes.

The hams are supplied to the charge end or upstream end of the main trough 24 from a charge or supply chute 54 and are carried along the main trough 24 by the flow of brine. Hams 56 at an upper level in the brine are engaged by a rotatable engaging means indicated at 58. This includes a plurality of specially-shaped tines or fingers 60 and 62 located diametrically-opposite one another. Each of these includes a radially extending straight portion 64, an offset portion 66, a cradle portion 68, and a curved end portion 70. The latter terminates in a blunt end 72 which can be formed by a stainless steel ball welded there to prevent penetration of the hams by the fingers.

The fingers 60 and 62 are mounted on a central drive and supporting shaft 74 and are spaced apart in predetermined fixed relationship, there being four of the fingers 60 and 62 across the width of the receptacle 24. The shaft 74 is rotatably mounted in adjustable bearing blocks 76 (FIG. 1) which have grooved edges received on gibs or guides 78 formed in side stands 80 which extend upwardly from the tank 12. The shaft 74 and the bearing blocks 76 are vertically adjustable by means of threaded rods 82 rotatably held by the blocks 76 and extending through a supporting bar 84 at the upper end of the stand 80. The rod 82 has a nut 86 above the bar 84 which can be turned upwardly and downwardly relative to the threaded rod 82 to correspondingly move the blocks 76, the shaft 74, and the fingers 60 and 62. With this adjustment, the distance the fingers 60 and 62 extend into the brine can be varied, so that the degree of fat on the hams picked up by the fingers 60 and 62 can be controlled. With the fingers high in the brine, only the fatter hams are removed therefrom whereas, as the fingers are moved lower, leaner hams will also be engaged and removed by the fingers.

As shaft 74 can be rotated in a clockwise direction as shown in FIG. 1 by any suitable means. As shown, a slip sprocket 88 is mounted on the shaft 74 and can slip relative thereto in case of a jam. The sprocket 88 is driven through a chain 90 which extends around an idler sprocket 92 mounted on a weighted arm 94 pivoted at 96 to a suitable supporting frame 98. The arm and idler sprocket keep constant tension on the chain 90 when the shaft 74 is adjusted upwardly or downwardly. The chain 90 also extends around a fixed idler sprocket 100 and a drive sprocket 102. The drive sprocket 102 is mounted on a drive shaft 104 which extends into a speed reducer 106. The latter, in turn, is driven by a suitable motor 108 supported on the frame 98. A pair of side walls 110 and 112 are located at the sides of the fingers 60 and 62 to help retain the hams on the fingers and to minimize splashing of the brine. A plurality of discharge rods 114 direct the hams from the fingers 60 and 62 downwardly to a first discharge chute 116 extending transversely of the trough 24 and directing the fatter hams picked up by the fingers 60 and 62 to one side of the tank. The hams gently roll down the sloping offset portions 66 of the fingers 60 and 62 and down the rods 114 at about the time the fingers are slightly beyond the vertical position, generally as shown in FIG. 1.

With the two sets of the fingers 60 and 62, it is possible for a floating or fatter ham to escape the fingers as they rotate. To overcome this possibility, a supporting bar 118 extends across the main trough 24 between the side wall 30 and the partition 32. Three horizontal supporting rods 120 extend toward the charge or upstream end of the trough 24 from the bar 118 and are positioned to be between the four fingers 60 or 62 as they rotate. Vertical stop rods 122 are adjustably mounted on the ends of the supporting rods 120 and extend a desired distance into the brine. A floating ham then missed by the fingers will engage the vertical stop rods 122 and be held temporarily thereby until the next set of fingers 60 or 62 rotates downwardly once again into the brine and engages this ham.

The leaner hams are carried along the main trough 24 by the flow of brine at a sufficiently low level to pass below the fingers 60 and 62 and below the stop rods 122. These hams are engaged by rotatable engaging means indicated at 124 at the downstream end of the trough 24. The rotatable means includes a plurality of tines or fingers 126 or 128 located diametrically opposite one another and shaped similarly to the fingers 60 and 62. Each of the tines includes a radially extending straight portion 130, an offset portion 132, a cradle portion 134, and a curved end portion 136. The latter terminates in a blunt end 138 which can be formed by a steel ball welded thereto to prevent the fingers from penetrating the hams.

The groups of fingers 126 and 128 are mounted on a central drive and supporting shaft 140 and are spaced apart in predetermined, fixed relationship on the shaft, there being four of each of the fingers 126 and 128 across the width of the main trough 24. The shaft 140 is rotatably mounted in fixed bearing blocks 142 supported above the upper edges of the tank side 30 and the partition 32.

The shaft 140 can be rotated in a clockwise direction, as viewed in FIG. 1, by any suitable means. As shown, the drive includes a slip sprocket 144 which is effective to drive the shaft 140 yet slip in case a ham becomes jammed. The sprocket 144 in turn is driven through a chain 146 which extends around a drive sprocket 148 mounted on a shaft 150 suspended below the tank by supports 152. The shaft 150 is driven by a sprocket 154 engaged by a chain 156 and driven by a sprocket 158 mounted on the shaft 104. The shaft 104 extends into the speed reducer 106 and is driven by the motor 108.

A pair of side walls 160 and 162 are located adjacent the outer ones of the fingers 126 and 128 to aid in retaining the hams on the fingers and to minimize splashing of the brine. A plurality of discharge rods 164 direct the hams from the fingers downwardly to a discharge chute 166, the rods 164 being located between the fingers 126 and 128 and also beyond the outermost ones of the fingers 126 and 128. The hams picked up by the fingers 126 and 128 are carried by the cradle portions 134 and then gently roll down the offset portions 132 and down the rods 164 and the chute 166.

A plurality of rods 168 are mounted on the upper edge of the end tank wall 28 and extend forwardly and downwardly at an angle of about 45°. These rods are also positioned to be between the fingers 126 and 128 during rotation and hold lean hams 170 which are not picked up by the fingers prior to reaching the rods. A pair of upper supporting rods 172 extend upwardly outside of the side walls 160 and 162 and aid in positioning the rods 164, the chute 166, and the rods 168 in proper position on th upper edge of the end wall 28.

Baffles 174 are located at the outer corners of the main trough 24 and the return trough 40 to aid in directing the flow of brine and maintaining the velocity of it. The velocity is determined by the speed of the propeller 44 driven by the variable speed motor 52 and the velocity determines the output of the apparatus.

It will be seen from the above that the grading apparatus 10 is a compact and efficient unit. It is also readily adaptable to be moved from one location to another as the need arises.

Various modifications of the above described embodiment of the invention will be apparent to those skilled in the art and it is to be understood that such modifications can be made without departing from the scope of the invention, if they are within the spirit and the tenor of the accompanying claims.

I claim:

1. Apparatus for separating relatively fat and relatively lean pieces of meat comprising an elongate receptacle, means for supplying liquid of particular density to one end portion of said receptacle, means for withdrawing the liquid from the other end portion of said receptacle and recirculating it back to the first end portion, whereby pieces of meat supplied to said receptacle near said liquid supply means tend to move along with the liquid toward the other end portion, first rotatable-engaging means for picking up and removing relatively fat pieces of meat located at an upper level in the liquid, said first rotatable-engaging means comprising a shaft, a plurality of fingers mounted in spaced, fixed relationship on said shaft and having first portions extending outwardly therefrom, said fingers also having second, generally circumferentially-extending portions at the ends of said first portions and extending toward said one end portion of said receptacle when immersed in the liquid, said second portions being of sufficient length to pick up and remove from the liquid the relatively fat pieces of meat engaged thereby, second rotatable-engaging means near said other end portion of said receptacle for picking up and removing relatively lean pieces of meat located at a lower level in the liquid, a plurality of rods located adjacent said first rotatable means and staggered with respect to said fingers, said rods being slanted to receive the pieces of meat picked up by the fingers and to direct the pieces away from said first rotatable means.

2. Apparatus according to claim 1 characterized by means for moving said shaft in a vertical direction relative to the level of the liquid.

3. Apparatus according to claim 2 characterized by said means for moving said shaft in a vertical direction comprises means for rotatably supporting said shaft at end portions thereof, guide means for receiving and guiding said rotatable supporting means in a vertical direction, and means for moving said rotatable-supporting means in a vertical direction.

* * * * *